United States Patent Office 3,544,596
Patented Dec. 1, 1970

3,544,596
PROCESS FOR THE PREPARATION OF THIOPHENES
Robert D. Dillard, Zionsville, Ind., assignor to Eli Lilly and Company, Indianapolis, Ind., a corporation of Indiana
No Drawing. Continuation-in-part of abandoned application Ser. No. 571,974, Aug. 12, 1966. This application June 20, 1969, Ser. No. 835,266
Int. Cl. C07d 63/12; A01n 9/12
U.S. Cl. 260—332.8   1 Claim

ABSTRACT OF THE DISCLOSURE

Thiophenes are prepared by the reaction of an alkali metal sulfide or hydrosulfide and a 5-chloropent-3-en-1-yne. Process useful for making highly substituted thiophene possessing at least a methyl function in the 2-position.

CROSS-REFERENCE TO RELATED APPLICATIONS

This application is a continuation-in-part of my copending application Ser. No. 571,974, filed Aug. 12, 1966, and now abandoned.

BACKGROUND OF THE INVENTION

This invention relates to a novel process for the preparation of thiophenes.

Thiophenes have been prepared from the appropriately substituted 1,4-dihaloalkanes, and sodium sulfide by the method of Karrer and Schmid, Helv. Chim. Acta., 27, 116 (1944); Robles, Rec. Trav. Chim., 58, 111 (1939); and Wolf and Folkers, Organic Reactions, vol. 6, John Wiley and Sons, New York (1951), page 410. They can likewise be prepared from 1,4-dicarbonyl compounds, as for example, 1,4-diketones or succinic acid derivatives, by the action of phosphorus sulfide; Farrer and Levine, J. Am. Chem. Soc., 72, 4433 (1950); Phillips, Org. Syntheses, Coll. vol. II, p. 578 (1943); Youtz and Perkins, J. Am. Chem. Soc., 51, 3511 (1929); Lindstead, Noble, and Wright, J. Chem. Soc., (1937), p. 915. The reaction of 1,3-butadienes with molten sulfur at 320–420° C. will also afford a low yield of thiophene derivatives, Shepard, Henne, and Midgley, J. Am. Chem. Soc., 56, 1355 (1934).

It is an object of this invention to provide a new method for the preparation of thiophenes.

A further object is to afford an economical preparation for certain highly-substituted thiophenes.

Another object is to provide a new method for the manufacture of useful thiophenes involving a minimum of manufacturing steps and giving a high over-all yield.

A still further object of this invention is to provide a method for the preparation of thiophenes from inexpensive, readily-available starting materials.

Other objects of the invention will become apparent from the further disclosures provided herein.

SUMMARY OF THE INVENTION

The objects of this invention are fulfilled by reacting an appropriately substituted 5-chloropent-3-en-1-yne with an alkali metal sulfide or hydrosulfide at from about 30° C. to about 100° C. for from about ½ to about 24 hours.

The process of this invention can be represented by the chemical equation:

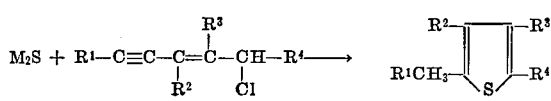

wherein:

$M_2S$ is an alkali metal sulfide or hydrosulfide;
$R^1$ is hydrogen, lower alkyl, phenyl, or naphthyl;
$R^2$, $R^3$, and $R^4$ are hydrogen, lower alkyl, $C_3$–$C_6$ cycloalkyl, phenyl, naphthyl, or a heterocyclic ring of from 5 to 7 atoms containing no more than 2 hetero atoms, said hetero atoms being oxygen, nitrogen, or sulfur.

DETAILED DESCRIPTION OF THE INVENTION

The process of the invention comprises commingling a compound of the formula:

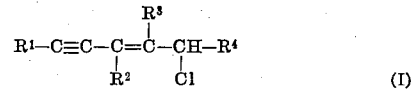

with an alkali metal sulfide or hydrosulfide, wherein $R^1$, $R^2$, $R^3$, and $R^4$ have the meanings defined hereinabove, at a temperature sufficient to cause reaction to occur, and isolating the desired thiophene therefrom.

"Lower alkyl" as used in this specification refers to methyl, ethyl, n-propyl, and isopropyl.

"Heterocyclic rings of from 5 to 7 atoms" includes pyrrolyl, pyrrolinyl, thienyl, dihydrothienyl, oxazolyl, oxazolinyl, imidazolyl, pyrazolyl, thiazolinyl, isothiazolyl, thiazolidinyl, furyl, dihydrofuryl, piperazinyl, pyrimidinyl, imidazolinyl, piperidyl, morpholinyl, pyranyl, homothiomorpholinyl, homopyrazinyl, and the like.

"$C_3$–$C_6$ cycloalkyl" includes cyclopropyl, cyclobutyl, cyclopentyl, and cyclohexyl.

An "alkali metal salt of a sulfide or hydrosulfide" includes lithium sulfide, lithium hydrosulfide, sodium sulfide, sodium hydrosulfide, potassium sulfide, potassium hydrosulfide, rubidium sulfide, rubidium hydrosulfide, cesium sulfide, cesium hydrosulfide, and the analogous mixed alkali-metal salts, as for example potassium sodium sulfide and the like.

The starting materials for the present invention can be prepared in the following manner. Appropriately substituted ketones are reacted with ethynyl organo-metallic derivatives in a manner well known in the art to produce tertiary ethynylcarbinols of the following formula:

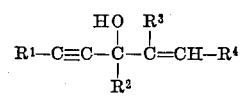

wherein the substituents are as hereinabove defined.

These intermediates are then treated with hydrogen chloride by the method of Heilbron et al., J. Chem. Soc., 1945, 77, 80; and Hennion et al., J. Am. Chem. Soc., 72, 3542 (1950), J. Am. Chem. Soc., 71, 1964 (1949). According to the method of Heilbron, the introduction of chlorine is accompanied by a rearrangement yielding the appropriately substituted derivatives of the 5-chloro-3-penten-1-yne.

The reaction of this invention can be carried out in the presence of a non-reacting diluent, if desired, although such a diluent is not necessary. Examples of suitable diluents include ethanol, benzene, xylene, toluene, dibutyl ether, petroleum ether, tetrahydrofuran, and the like. The reaction can be carried out around room temperature or a somewhat elevated temperature, as for example from 30–100° C. The reaction is substantially complete in from 0.5 to 24 hours, varying with the starting materials, and varying inversely with the reaction temperature. The reaction product mixture is cooled to room temperature if it has been heated and the product is isolated by crystallization or distillation.

While the compounds provided by the process of the present invention have been defined in terms of a structural formula which depicts the structural features of the intermediate and product compounds and which indicates the presence therein of certain well-known organic radicals, including alkyl, phenyl, naphthyl, cycloalkyl, and certain defined heterocyclic rings, it will be recognized by those skilled in that art that such radicals may bear one or more substituents without requiring any significant modification of the process of the invention. The preparation of compounds bearing such substituents is accordingly to be considered to lie within the scope of the invention. Among such substituent atoms and radicals are fluoro, chloro, bromo, nitro, lower alkyl, trifluoromethyl, pentafluoroethyl, lower alkoxy, lower alkylmercapto, cyano, phenyl, acetyl, acetamido, and the like.

The thiophene derivatives prepared in this manner are useful as solvents. They also possess soil fungicidal, antimicrobial, and insecticidal activity.

The following illustrative examples will serve to further describe the invention, but are not to be construed as the exclusive embodiments thereof.

EXAMPLE I 3-phenyl-5-chloro-3-penten-1-yne was prepared by the reaction of an excess of an ethereal solution of anhydrous hydrogen chloride and 4 g. of 3-hydroxy-3-phenyl-4-penten-1-yne at —5° C. Boiling point: 105–110° C. at about 4 mm. Hg.

3-phenyl-5-chloro-3-penten-1-yne was added to 200 ml. of ethanol containing 20 g. of powdered sodium hydrosulfide. The mixture was refluxed for 4 hours and allowed to stir for 16 additional hours at 25° C. It was then diluted with water and extracted with ether, and the ether solution was dried with anhydrous magnesium sulfate. The ether was evaporated in vacuo and the residue separated by adsorption and elution from a Florisil column with benzene as eluting solvent. The product, 2-methyl-3-phenylthiophene, 3.11 g., was a viscous oil.

EXAMPLE II 2,3-dimethylthiophene was prepared from 3-methyl-5-chloro-3-penten-1-yne by the method of Example I. Boiling point: 61.5–62° C. at about 50 mm. Hg.

The following and like compounds can be prepared in a manner similar to Example I from the appropriately substituted chloropentenyne:

2,4-diethyl-3-isopropyl-5-phenylthiophene from 4-isopropyl-5-ethyl-6-chloro-6-phenyl-4-hexen-2-yne;

2 - benzyl - 3 - (α-naphthyl)thiophene from 1-phenyl-3-(α-naphthyl)-5-chloro-3-penten-1-yne;

2 - dimethylaminomethyl - 3 - (n-propyl)-4-phenyl-5-methylthiophene from 1-dimethylamino-4-(n-propyl)-5-phenyl-6-methyl-6-chloro-4-hexen-2-yne;

2 - diethylaminomethyl - 3 - phenyl-4-(α-thienyl)-5-phenylthiophene from 1 - diethylamino - 4 - phenyl-5-(α-thienyl)-6-phenyl-6-chloro-4-hexen-2-yne;

2 - (1 - naphthylmethyl) - 3 - ethyl-4-isopropylthiophene from 1-(1-naphthyl) - 3 - ethyl - 4 - isopropyl-5-chloro-3-penten-1-yne;

2 (3 methylbutyl) - 3 - (α-naphthyl)thiophene from 2-methyl-5-(α-naphthyl)-7-chloro-5-hepten-3-yne.

I claim:
1. A process for the preparation of a compound having the structural formula:

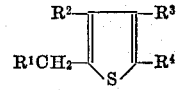

wherein:
R¹ is hydrogen, lower alkyl, phenyl, or naphthyl;
R² is hydrogen, lower alkyl, $C_3$–$C_6$ cycloalkyl, phenyl, naphthyl, or a heterocyclic ring of from 5 to 7 atoms containing no more than 2 hetero atoms, said hetero atoms being oxygen, nitrogen, or sulfur; and
R³ and R⁴ are hydrogen, lower alkyl, $C_3$–$C_6$ cycloalkyl, phenyl, naphthyl, or a heterocyclic ring of from 5 to 7 atoms containing no more than 2 hetero atoms, said hetero atoms being oxygen, nitrogen, or sulfur which comprises commingling a compound of the formula:

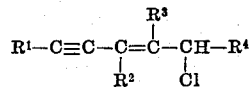

wherein R¹, R², R³, and R⁴ are as hereinabove defined, with an alkali metal sulfide or hydrosulfide, at about 30° to about 100° C. and for about ½ to about 24 hours to cause reactions thereof and recovering therefrom the desired product.

OTHER REFERENCES

Wolf et al.: Org. Reactions, vol. VI, pp. 410–68.

HENRY R. JILES, Primary Examiner

C. M. SHURKO, Assistant Examiner

U.S. Cl. X.R.

260—465.7, 561, 562, 586, 592, 593, 609, 611, 612, 614, 617, 618, 638, 644, 645, 646, 648, 651, 653.3, 654; 424—248, 250, 251, 267, 269, 270, 272, 274, 275